United States Patent [19]

Stickel

[11] Patent Number: 4,585,418
[45] Date of Patent: Apr. 29, 1986

[54] METHOD FOR SIMULATION OF A VISUAL FIELD OF VIEW

[75] Inventor: Robert Stickel, Neu Isenburg, Fed. Rep. of Germany

[73] Assignee: Honeywell GmbH, Offenbach, Fed. Rep. of Germany

[21] Appl. No.: 694,892

[22] Filed: Jan. 24, 1985

Related U.S. Application Data

[63] Continuation of Ser. No. 443,092, Nov. 19, 1982, abandoned.

[51] Int. Cl.⁴ .............................................. G09B 9/00
[52] U.S. Cl. ........................................ 434/20; 434/43
[58] Field of Search .................................. 434/20–22, 434/43, 44; 358/104

[56] References Cited

U.S. PATENT DOCUMENTS

| | | | |
|---|---|---|---|
| 3,479,454 | 11/1969 | Wolff | 358/104 |
| 4,107,665 | 8/1978 | Mayer et al. | 273/313 |
| 4,209,832 | 6/1980 | Gilham et al. | 434/20 |
| 4,246,605 | 1/1981 | LaRussa | 434/20 |

Primary Examiner—Richard C. Pinkham
Assistant Examiner—Leo P. Picard
Attorney, Agent, or Firm—George W. Field

[57] ABSTRACT

Figure 2:
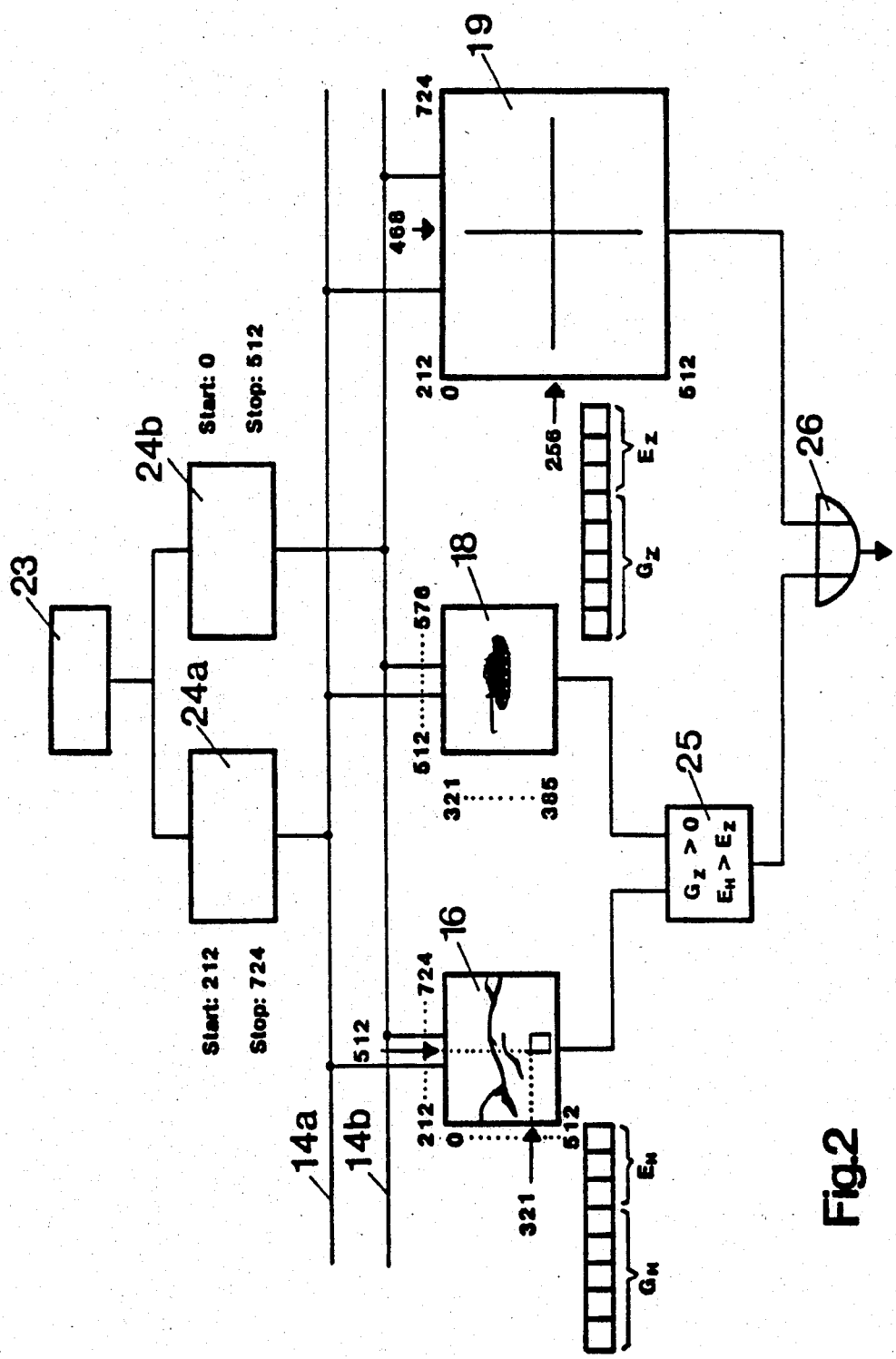

At the simulation of a visual field of view as it is used on battle trainers, the image (16) of a background and the image (18) of a moveable target is displayed on a TV-monitor in the field of view of the optics of a person to be trained. The images are digitally stored whereat each image point according to its gray value ($G_H$, $G_Z$) is digitally coded. Additionally, with respect to individual objects (forest, bush etc.) in the background each image point is provided with a digital encoded range information ($E_H$). By comparing this range information ($E_H$) with the range information ($E_Z$) of the target it is possible to decide with respect to the image area in which the target is present ($G_Z>0$) whether the target is to display in front of or behind the individual object (FIG. 2).

6 Claims, 6 Drawing Figures

METHOD FOR SIMULATION OF A VISUAL FIELD OF VIEW

This application is a continuation of application Ser. No. 443,092, filed Nov. 19, 1982, now abandoned.

The present invention relates to a method for simulation of a visual field of view. Such a method is especially used on devices for training of a battle situation.

From DE-PS No. 28 03 101 a method for producing a background image is known, whereat an image on a monitor may be produced as a random partial cut-out from an overall image. The selection of the partial cut-out herewith for instance is made by address producing means coupled to control handles by which portions of individual images may be called up and put together to a partial cut-out. According to DE-OS No. 29 19 047, these individual images may be digitally stored and it is possible to cut in silhouettes or images of certain objects as, for instance, of moveable targets into the background image displayed on the monitor according to the addressed partial cut-out. Generation of those silhouettes or images herewith in a known manner is done by a computer. If such a monitor is arranged in the field of view of the optics of a gunner or commander, then, for instance, a battle situation for tank crews may be simulated.

It is the object of the present invention to improve a method for simulation of a visual field of view of the previously mentioned species in such a manner that the battle situation may be simulated much more closely to reality. Futher advantageous embodiments of the method may be taken from the subclaims.

Figure 1:
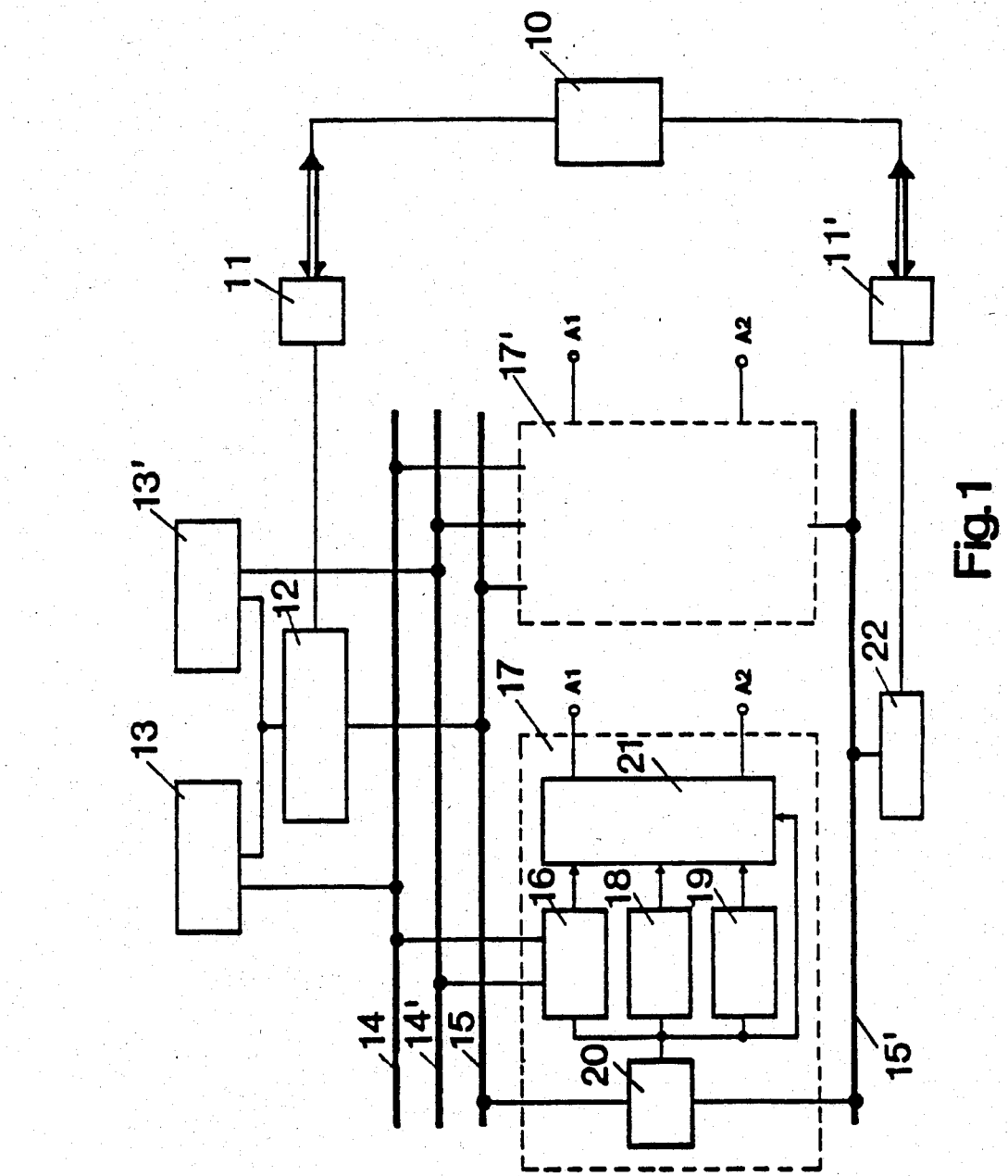
Figure 3:
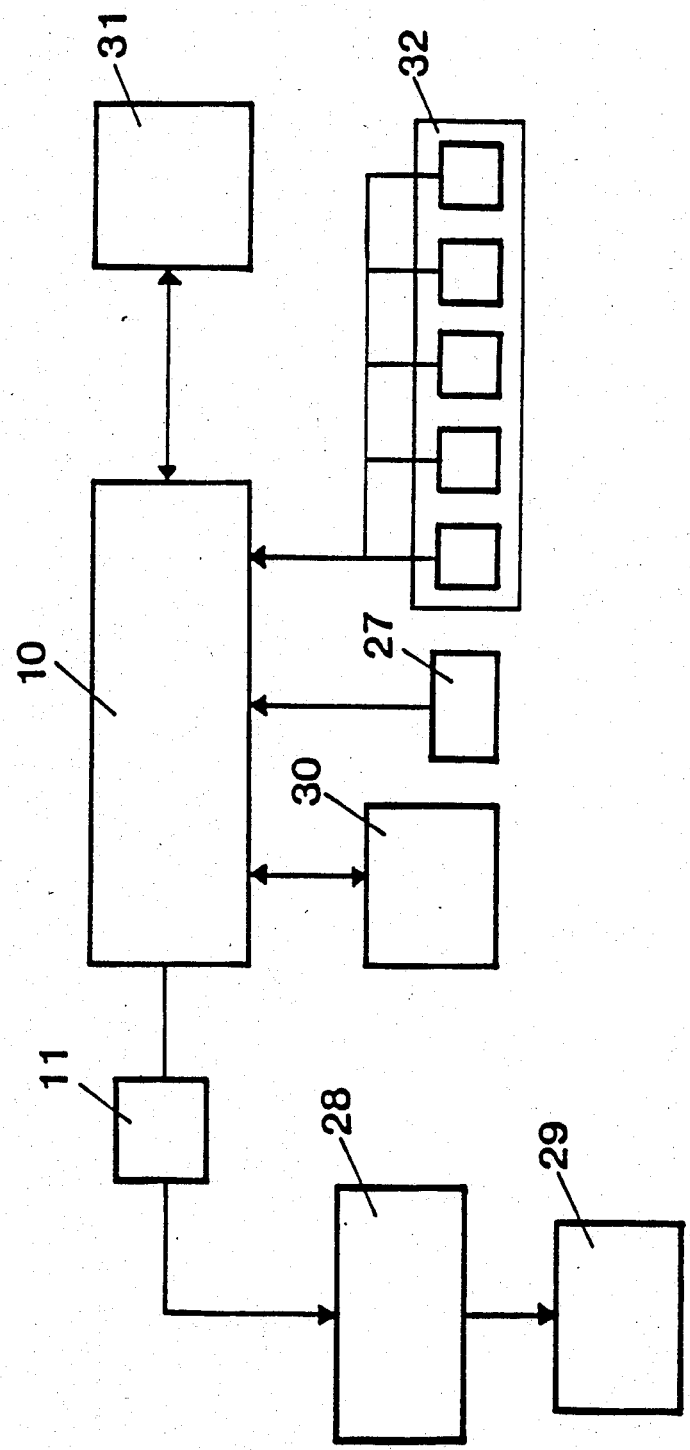
Figure 4:
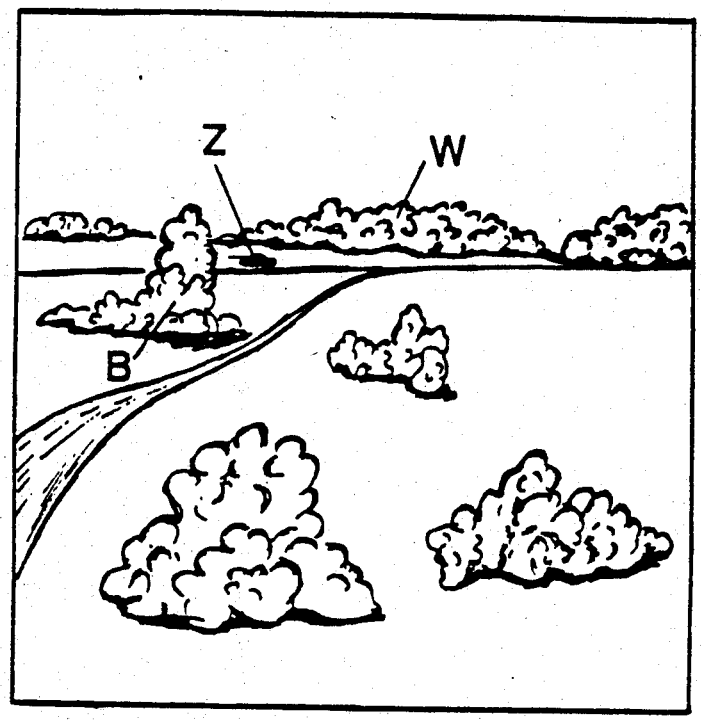
Figure 5:
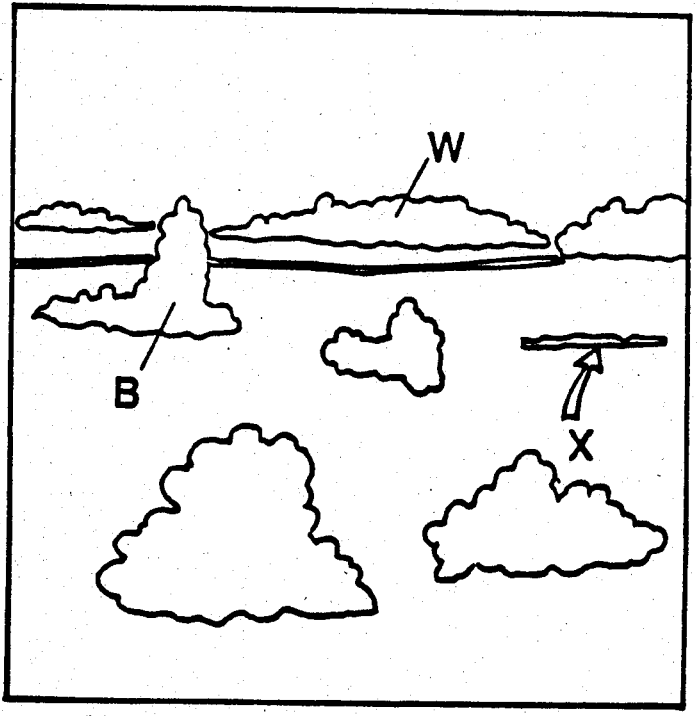
Figure 6:
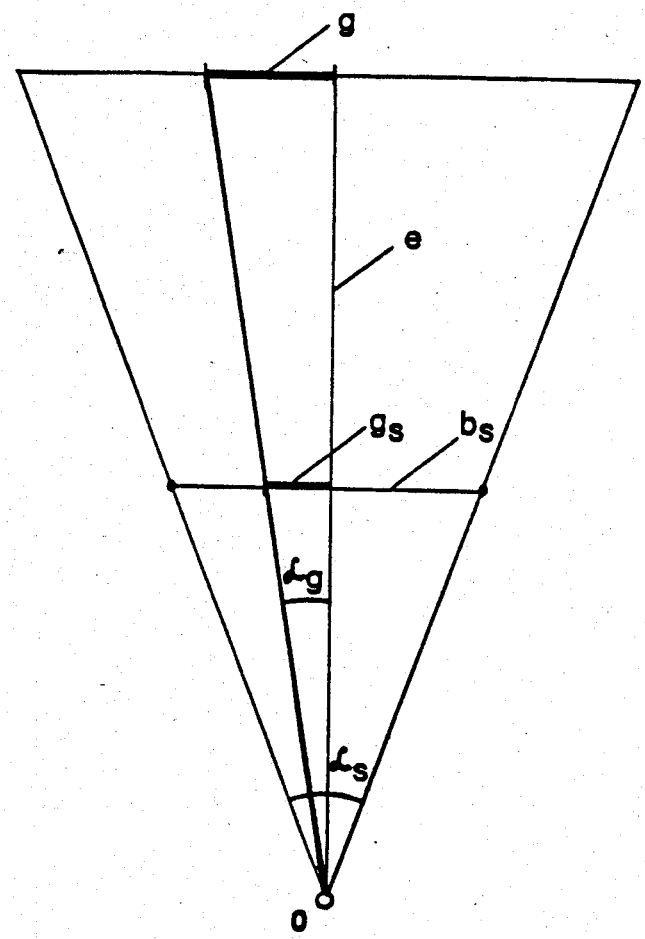

With respect to an embodiment shown in the figures of the attached drawing, in the following the invention shall be further explained. It shows:

FIG. 1 a block diagram for explaining the CSI method according to the invention (CSI=Computer Synthesized Imagery);

FIG. 2 a further block diagram for explaining the image selection and the image combination;

FIG. 3 a block diagram for explaining the generation of a target course;

FIG. 4 an illustration of the monitor image appearing in the field of view of an optics;

FIG. 5 a schematical illustration according to FIG. 4 with individual objects arranged under different distances; and FIG. 6 a sketch explaining the evaluation of the range of individual objects by means of targets moveable in the background.

According to FIG. 1, the important parts of a system are shown on which the CSI method according to the invention is performed. A system image computer 10 controls the whole system. To this computer, for instance, the address signals are applied which are derived from not shown control handles. Said computer controls background memories 13, 13', . . . via an interface 11 and memory managing unit 12 with an image of a background being stored in said memories. Cut-outs from said background image may be selected by the signals of the control handles. Futheron to said computer a not shown panel is connected by which panel certain stored targets may be called up and by which panel a course may be provided for said targets.

The background video information digitally stored in the background memory 13, 13' is applied to a monitor memory 16 in a first monitor control unit 17 via image busses 14, 14' under control by a control bus 15. A second monitor control unit 17' as well as further such units may be arranged according to the number of monitors so that at the same time a plurality of persons may be trained. The monitors not shown in FIG. 1 are arranged in the field of view of the optics of a gunner or commander whereat the screen justly fits into the field of view of the viewing optics.

Besides the cut-out from the background image stored in the monitor memory 16, an image of the target and an image of a reticle are stored in a target memory 18 and a sight memory 19. The sight memory 19 may also store the rotational position or any other information with respect to for instance a tank vehicle. A monitor managing unit 20 controls the memory assignment. Furtheron, a concentrating computer 22, connected via an interface 11' to the system image 10, is taking over a subordinate assignment of the individual monitor control units 17, 17' etc. via a further control and data bus 15'.

After combining the contents of all three memory units 16, 18 and 19 in an image mixer 21, as well as after converting the digital image information into an analog video information over separate outputs A1 respectively A2, the monitors are controlled which are assigned to the gunner respectively the commander. Through a control by means of the control handles it is possible to track the moveable target with the reticle whereat the cut-out of the background image experiences a continuous change. The gunner respectively the commander, therefore, at his view to the monitor screen arranged in the field of view of his optics, gets the impression of a battle situation very close to the reality.

According to FIG. 2, details of the system according to FIG. 1 are shown. A central TV clock generator 23 controls x and y address generators 24a and 24b. The address generators 24a and 24b for instance are presented by digital angle encoders coupled to the control handles and they select via an x-bus 14a and a y-bus 14b by means of the address a predetermined cut-out from the background image. Futheron, the target and the sight are added to the background. According to an essential feature of the present invention, each image point of the background respectively of the target is digitally encoded by a plurality of bits with respect to its gray level $G_H$, $G_z$, as well as with respect to its range $E_H$, $E_Z$. Therefore, a decision logic 25 is able to determine whether with a present target ($G_Z > 0$) this target is to display in front of an individual object (house, bush, forest) in the background ($E_H > E_Z$) or behind that individual object ($E_H < E_Z$). After combining of an accordingly selected image point with the reticle and after a following digital/analog conversion, display of the mixed image is presented on the monitor.

FIG. 3 shows an extension of the system according to FIG. 1 with the possibility of generating a target course. By means of a control handle 27 connected to the system image computer 10, an operator may select a scenery from the digital background memory 13 of the CSI system 28 which may be relevant for the training so that this scenery is displayed on the monitor 29. Furtheron, the operator may call up the display of a target (e.g. tank) by means of a panel 30. The targets may be stored for instance in a disk memory library 31 which contains a computer compatible representation of different targets in different attitudes. By means of a further input device 32, it is possible to input besides the position x, y on the screen and the range E (i.e. size) the pitch-, yawand roll angles N, G and R of the target in an arbitrary manner. After input of these values they are called up from the system image computer 10 by means of the panel 30. The target described by these values presents now a single cut-out from the whole target course, for instance the start of the course. Then the operator may define in the same manner as many points on the target course as he wants and the system image computer 10 may be advised via the panel 30 of the velocity with which the target is moving on the defined course. At the display of the course on the monitor an interpolation takes place between all values x, y, E, N, G and R which have been inputted point by point. The display on the monitor then results in a continuous movement of the target image which is produced by the computer (CGI=Computer Generated Image). This leads to the impression of a true target motion.

With a standard monocular taking of the background picture for instance with a video camara, any range information with respect to the lastly digitally stored background image is missed. On the other hand, the target course contains a range information and the target changes its size when moving on its course. In order to determine now the range of certain individual objects e.g. bush, forest, etc. in the background image, the following may be done:

FIG. 4 shows a target Z in the shape of a tank laterally displayed before a forest W. The scale of reproduction of the target Z, i.e. its range may be changed by means of the described input device 32 as long as its size is represented to the operator in a realistic relationship to the individual objects in the background image. It is known that the field of view of the optics for instance is given by an angle of 6° whereat the screen arranged in the field of view of the optics comprises a width of e.g. 107 mm. Then 1 mm in the width corresponds to 6/107° = 1 crossline of the graticule. If then the lateral side of the tank in FIG. 4 appears under an angle of 6 crosslines and if, on the other hand, the length of the tank is for instance given with 6 m, then the distance to the tank must be 100 m. In the shown position of the tank directly in front of the forest it is therefore possible to assign a range of 1000 m to the forest. In the same manner, the ranges of the bushes displayed in front of the forest may be determined.

The basis of the measuring principle explained ahead best may be taken from FIG. 6. It shall be assumed that the screen of the monitor with respect to the operator O is arranged in such a way that its image width $b_s$ justly is filling its viewing field $\alpha_s$ of the viewing optics. Herewith an object having the size g in the distance e is reproduced on the screen with the size $g_s$ and is viewed from the operator O under the angle $\alpha_g$.

From FIG. 6 the following relationship may be derived:

$$g/e = \tan \alpha_g$$

for $e \gg g$ the following is true:

$$g/e = \alpha_g \quad (1)$$

Further the following is true:

$$g_s/b_s = \alpha_g/\alpha_s \quad (2)$$

From equations (1) and (2) results:

$$e = b_s/\alpha_s \cdot g/g_s \quad (3)$$

As a numerical example, it may be assumed that the screen has a width $b_s$ of 125 mm and that this width is filling the field of view of $\alpha_s = 6°$ (corresponds to 105 mrad). If one takes then as a target a tank in a lateral view having a length of g=6 m and if this tank is reproduced on the screen with a length of $g_s = 3,5$ mm, then the range e may be computed as follows:

$$e = \frac{125 \text{ mm}}{105 \text{ mrad}} \cdot \frac{6 \text{ m}}{3,5 \text{ mm}} = 2041 \text{ m}.$$

The range evaluated in this manner is assigned to the individual object in the background image adjacent to the tank. If for instance each image point is coded by 16 bit, whereat 8 bit (256 levels) are provided for the different gray values, then the remaining 8 bit are available for 256 range levels. With a simulation of a visual field of view at tank sights and with a maximum battle distance of 3000 m, 256 range levels may be provided in the range between 500 and 3000 m, whereat with the lowest significant bit a smallest range increment of 10 m is codeable.

According to FIG. 5 to all image points within the contour of an individual object B, W in the background image, the same range information is assigned. For this purpose, known methods may be used with which for instance an image point on the contour of an object is unblanked and whereat by means of an input device (track ball) the unblanked image point on the contour of the individual object is displaced. By means of an appropriate computer program to all image points within the detoured curve, the same range value may be assigned.

On the other hand, in a natural environment depressions are to be found in a landscape which may not be seen with an unaided or aided eye if the margin of the depression has no remarkable sharpness. A vehicle which is driving in such a depression then intersects an object which may be not observed by an operator. In order to simulate also such a situation it is possible to provide such a depression X for instance in meadow landscape. Also in this case a certain area may be detoured by an unblanked image point and a range information may be assigned to that area and the target then driving into this area may be partly or totally covered.

I claim:

1. Method for simulation of a visual field of view for training of a battle situation, so that the image of a background is displayed on a TV monitor in the field of view of the optics of a person to be trained and the image of a movable target is cut-in in that background, and so that the image of the background as well as the image of the target are digitally stored and are displayed after conversion into a video signal, characterized in that individual objects in the background image are provided with a digital range information and that image point by image point the range information with respect to the individual objects is compared with a digital range information of the target in order to determine image point by image point whether the target is covered by the individual object or is to display in front of that individual object, and further characterized in that the range information with respect to the individual object is produced by controlling the coordinates and thereby moving the target in the neighborhood of the respective individual object and that by scaling of the target with respect to the background image a realistic relationship between the target and the background image is produced so that, with a known cut out of the optics field of view and with a known size of the target, the range may be assigned to the individual object and further characterized in that by unblanking of an image point on the contour of the individual object with the unblanked image point, the same range information is assigned to all image points within the individual object.

2. Method according to claim 1, further characterized in that with respect to different points of the target course besides the coordinates and a range information additional pitch-, yaw-, and roll angles are provided by an operator and that through interpolation by means of a computer a target course with a realistic motion behavior is produced.

3. Method according to claim 1, further characterized in that individual areas may be provided randomly in the background image in which areas the target is displaced partly or totally covered by the background.

4. Method according to claim 1 further characterized in that each image point of the target as well as the background comprises an information coded by a plurality of bits with respect to the grey value and to the range.

5. Method according to claim 1 further characterized in that individual areas may be provided randomly in the background image in which areas the target is displayed partly or totally covered by background.

6. Method for simulation of a visual field of view for training of a battle situation, so that the image of a background is displayed on a TV monitor in the field of view of the optics of a person to be trained and the image of a movable target is cut-in in that background, and so that the image of the background as well as the image of the target are digitally stored and are displayed after conversion into a video signal, characterized in that individual objects in the background image are provided with a digital range information and that image point by image point the range information with respect to the individual objects is compared with a digital range information of the target in order to determine image point by image point whether the target is covered by the individual object or is to display in front of that individual object, and further characterized in that the range information with respect to the individual object is produced by controlling the coordinates and thereby moving the target in the neighborhood of the respective individual object and that by scaling of the target with respect to the background image a realistic relationship between the target and the background image is produced so that, with a known cutout of the optics field of view and with a known size of the target, the range are assigned to the individual object, the method being further characterized in that by unblanking of an image point on the contour of the individual object and by detouring of that individual object with the unblanked image point, the same range information is assigned to all image points within the individual object, the method being further characterized in that with respect to different points of the target course besides the coordinates and a range information, additional pitch, yaw, and roll angles are provided by an operator and that through interpolation by means of a computer a target course with a realistic motion behavior is produced, the method being further characterized in that each image point of the target as well as of the background comprises an information coded by a plurality of bits with respect to the grey value and to the range, and the method being further characterized in that individual areas may be provided randomly in the background image in which areas the target is displayed partly or totally covered by background.

* * * * *